United States Patent [19]

Saito

[11] Patent Number: 5,044,711
[45] Date of Patent: Sep. 3, 1991

[54] OPTICAL-FIBER ALIGNING MEMBER AND METHOD OF FORMING THE MEMBER

[75] Inventor: Kazuhito Saito, Kanagawa, Japan

[73] Assignee: Sumitomo Electric Industries, Ltd., Osaka, Japan

[21] Appl. No.: 585,667

[22] Filed: Sep. 20, 1990

[30] Foreign Application Priority Data

Oct. 17, 1989 [JP] Japan .................................. 1-271185

[51] Int. Cl.$^5$ .............................................. G02B 6/36
[52] U.S. Cl. .................... 350/96.2; 350/96.22
[58] Field of Search ................. 350/96.2, 96.21, 96.22

[56] References Cited

U.S. PATENT DOCUMENTS

| 4,475,790 | 10/1984 | Little ............................. 350/96.21 |
| 4,818,058 | 4/1989 | Bonanni ............................ 350/96.2 |
| 4,865,413 | 9/1989 | Hübner et al. .................. 350/96.21 |
| 4,973,127 | 11/1990 | Cannon, Jr. et al. ............ 350/96.22 |

FOREIGN PATENT DOCUMENTS

| 0005792 | 12/1979 | European Pat. Off. . |
| 52-140512 | 12/1979 | Japan . |
| 55-65913 | 5/1980 | Japan ............................ 350/96.21 |
| 61-134711 | 6/1986 | Japan ............................ 350/96.22 |

OTHER PUBLICATIONS

Miller; "Fiber-Optic Array Splicing with Etched Silicon Chips"; The Bell System Technical Journal, vol. 57, No. 1, Jan. 1987; pp. 75–90.

Primary Examiner—John D. Lee
Assistant Examiner—John Ngo
Attorney, Agent, or Firm—Cushman, Darby & Cushman

[57] ABSTRACT

An optical fiber aligning member includes at least two grooved substrates, each of which has a first main surface in which optical fiber aligning grooves and at least two first positioning grooves are formed and a second main surface opposite the first main surface in which at least two second positioning grooves are formed. The grooved substrates are laminated on top of each other in a manner so that each grooved substrate is alternately turned over. First positioning pins are positioned in the first positioning grooves and second positioning pins are positioned in the second positioning grooves for aligning the alternating grooved substrates. In a method for making the optical fiber aligning member, the fiber aligning grooves and the positioning grooves are formed in the surfaces of a flat plate. The grooved substrates are formed by dividing the flat plate at an angle perpendicular to the grooves. The grooved substrates are stacked alternately so that grooved substrates that were adjacent each other in the flat plate are stacked adjacent each other in the optical fiber aligning member with their positioning grooves opposing each other.

17 Claims, 2 Drawing Sheets

OPTICAL-FIBER ALIGNING MEMBER AND METHOD OF FORMING THE MEMBER

BACKGROUND OF THE INVENTION

1. Field of the Invention

The present invention relates to an optical fiber aligning member for two-dimensionally aligning and fixing optical fibers when connecting optical fibers to other optical fibers or when connecting optical fibers to optical components.

2. Description of the Prior Art

Conventionally, as shown in FIG. 1 (Prior Art), where optical components such as an LD (laser diode) or the like are connected to optical fibers, each optical fiber 10 is positioned in an optical-fiber groove 11 in a stage 12 which is movable in the x and y directions. The stage 12 is then minutely adjusted so that the optical fiber 10 and the optical component 13 are bonded to each other at a position where the connection efficiency is optimized. In a case where one optical fiber and one optical component are connected to each other, the conventional method in which the optical fiber is aligned and fixed has no significant problem except for the time required for the positioning.

Recently however, as optical component packaging density has increased, it has become necessary that a plurality of optical fibers and a plurality of optical parts are aligned and connected to each other within a limited narrow space. To cope with such component density, a technique has been used where optical fibers are arranged one-dimensionally with the same pitch as that of the optical components and only one core of the optical fibers is aligned so that the numbers of cores of the optical fibers can be simultaneously positioned.

However, as the packaging density has increased even further, it has been necessary to arrange optical fibers two-dimensionally or in a plane. In a case where the pitch of arrangement of optical fibers is particularly narrow, there is almost no space even for the above-mentioned aligning of each of the one-dimensionally arranged members and the labor for the alignment becomes enormous if the aligning of the cores is done individually. Accordingly, it would be desirable to establish a member by which positioning of optical fibers in two dimensions can be made with high accuracy.

SUMMARY OF THE INVENTION

It is therefore an object of the present invention to provide an optical-fiber aligning member and a method of forming the member, in which the problems of the prior art are solved.

To attain the above object, according to an aspect of the present invention, the optical fiber aligning member comprises a plurality of grooved substrates, each of the grooved substrates having a first main surface in which a plurality of optical fiber aligning grooves and at least two first positioning grooves are formed and a second main surface opposite the first main surface in which at least two second positioning grooves are formed, the grooved substrates being laminated one on one in a manner so that every grooved substrate is turned over alternately such that at least one pair of adjacent grooved substrates have first positioning grooves opposing each other and at least one pair of adjacent grooved substrates have second positioning grooves opposing each other while first positioning pins are positioned in the first positioning grooves opposing each other and second positioning pins are positioned in the second positioning grooves opposing each other, thereby comprising a two-dimensional optical fiber alignment.

According to another aspect of the present invention, the method of forming an optical fiber aligning member comprises the steps of: forming a plurality optical fiber aligning grooves and at least two first positioning grooves in a first main surface of a flat plate; forming at least two second positioning grooves in a second main surface opposite the first surface of the flat plate; dividing the flat plate having the grooves formed therein in a direction generally perpendicular to the optical fiber aligning grooves so as to obtain grooved substrates; and laminating the grooved substrates one on one in a manner so that every grooved substrate is turned over alternately such that at least one pair of adjacent grooved substrates have first positioning grooves opposing each other and at least one pair of adjacent grooved substrates have second positioning grooves opposing each other, each adjacent pair of grooved substrates having been adjacent each other in the flat plate prior to the dividing step and positioning pins in the positioning grooves opposing each other.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE PRESENTLY PREFERRED EXEMPLARY EMBODIMENTS

Figure 2A:
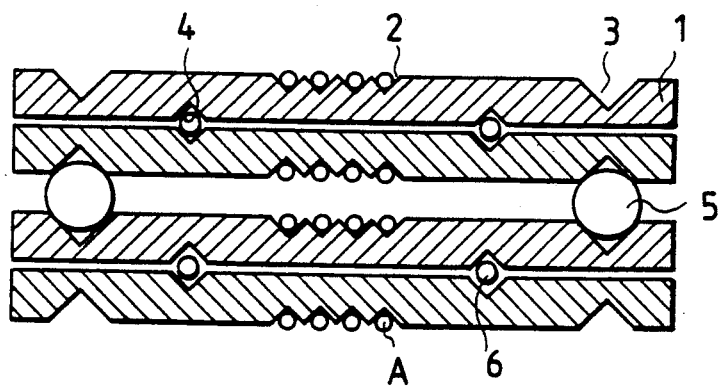
FIGS. 2A and 2B are cross-sectional views for explaining an embodiment of the optical fiber aligning member according to the present invention.
Figure 2B:
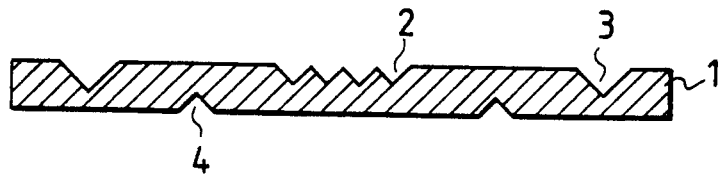

As shown in FIG. 2B, optical fiber aligning grooves 2 and at least two positioning grooves 3 are formed in the front or upper surface of a grooved substrate 1 through grinding, milling, molding or the like, and at least two positioning grooves 4 are formed in the lower or back surface of the grooved substrate 1 in the same manner as the positioning grooves 3.

Figure 3:
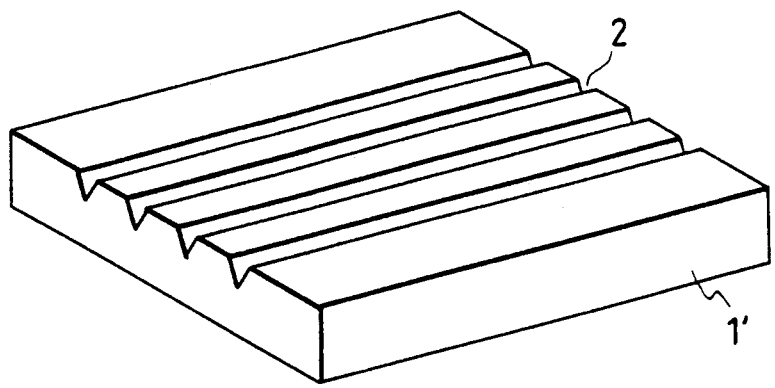
FIG. 3 is a perspective view of the optical fiber aligning member.

The grooved substrates 1 are laminated one on one in a manner so that every grooved substrate is turned over alternately while positioning pins 5 are positioned in the positioning grooves 3 opposite each other and positioning pins 6 are positioned in the positioning grooves 4 opposite each other, thereby comprising a two-dimensional optical fiber alignment. As described above, the technique of providing one-dimensional optical fiber alignment has already been established. As shown in FIG. 3, optical fiber aligning grooves 2 are worked in an upper surface of the grooved substrate 1. The work is performed, for example, through grinding so that each groove 2 has an angle of 90 degrees. A single crystal such as silicon having a high grinding ratio is used as the material of the grooved substrate 1.

Optical fibers 10 each having an outer diameter of 0.125 mm are positioned in the respective optical fiber aligning grooves 2 in the grooved substrate 1 and fixed thereat with an adhesive or the like to thereby provide a one-dimensional optical fiber alignment. Since the relative positional accuracy of the optical fibers 10 depends on the working accuracy of the grooves 2 in a grooved substrate 1', other dimensional factors have little influence on the accuracy. Accordingly, the one-dimensional alignment can be relatively easily realized only by establishing the groove working technique. In this example, the working accuracy was about $\pm 0.5$ $\mu$m when the pitch of the optical fiber aligning grooves 2 was 0.25 mm.

In a case where a two-dimensional optical fiber alignment is to be realized, however, it is almost impossible to directly form a two-dimensional aligning member by the current technique. It is more practical to consider a method of laminating the grooved substrates of the one-dimensional aligning members.

Here, there arises a problem as to how to position and laminate two or more grooved substrates with high accuracy. The present invention is to solve the problem.

Figure 4A:
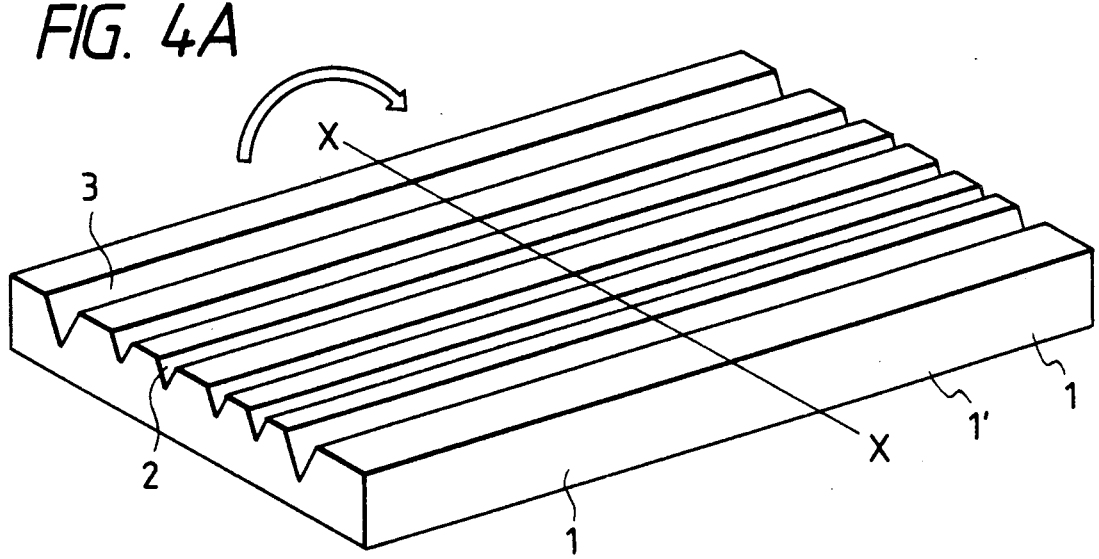
FIGS. 4A and 4B are views for explaining the grooved substrate laminating method according to the present invention.
Figure 4B:
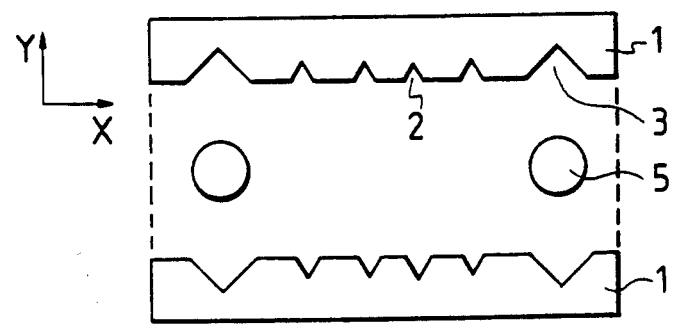

First, in a case where only two grooved substrates are placed on each other, as shown in FIG. 4B, two positioning V-shaped grooves 3 are worked in the opposite sides of the optical fiber aligning grooves 2 in the grooved substrate 1, respectively. A second grooved substrate 1 is disposed in a position symmetrical to the first grooved substrate 1 so that the respective grooved surfaces of the grooved substrates 1 are opposing each other, and the grooved substrates 1 are laminated on each other with two positioning pins 5 such as stainless steel pins of 0.5 mm. The positioning pins 5 are firmly fixed in the opposing positioning grooves 3 of the two grooved substrates 1, so that it becomes possible to position the optical fiber aligning grooves 2 of the two grooved substrates 1 with high accuracy. Specifically, the pitch of the optical fiber aligning grooves 2 in the Y-direction in the drawing can be easily adjusted by changing the diameter of each positioning pin 5.

In order to improve the relative positional accuracy of the optical fiber aligning grooves 2, a further forming method may be used in addition to the above-described method. As shown in FIG. 4A, a flat plate 1' in which optical fiber aligning grooves 2 and positioning grooves 3 are worked, is longitudinally halved into two grooved substrates 1 at the position shown by a line X—X in the drawing. The two divisional grooved substrates 1 are disposed so as to be opposite each other, and the two grooved substrates 1 may be laminated on each other with positioning pins 5 sandwiched therebetween. In this method, the alignments of the optical fiber aligning grooves which completely coincide with each other in the X-direction can be realized even if the relative positional accuracy of the optical fiber aligning grooves 2 and the positioning grooves 3 is not improved. Accordingly, the required accuracy can be obtained by properly adjusting the diameter of each of the positioning pins 5 in the Y-direction. A relative positional accuracy of not larger than $\pm 0.7$ $\mu$m can be obtained through such measures in structure and in formation.

Figure 1:
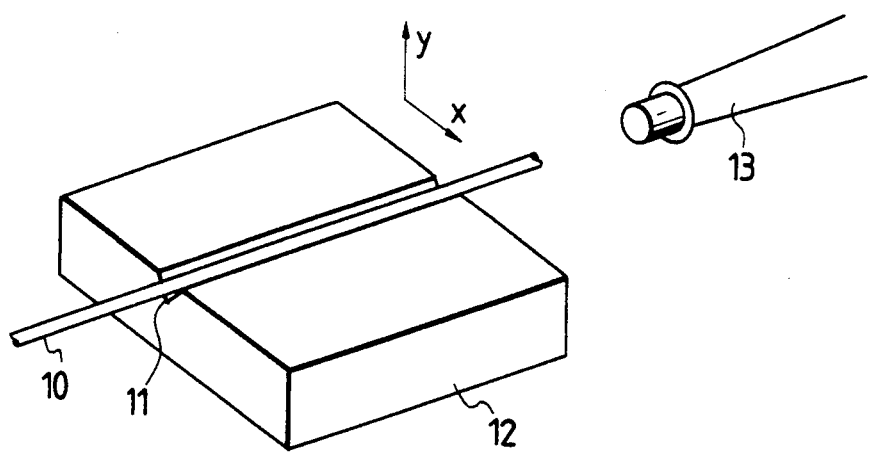
FIG. 1 is a view for explaining a conventional optical fiber positioning method.

Next, an advanced measure of laminating two or more grooved substrates will be described. The two-storied structure is as described above. In a case where it is desired that several grooved substrates be laminated one on one as shown in FIG. 1A, the grooved substrates 1 are laminated one on one so that every grooved substrate 1 is turned over alternately. In that case, although the lamination of the surfaces in which the optical fiber aligning grooves 2 are formed is as described above, it is necessary to newly form two or more positioning grooves 4 in the back surface of each grooved substrate 1. After the optical fiber aligning grooves 2 and the positioning grooves 3 are formed in the upper or front surface of each grooved substrate 1 as shown in FIG. 3, the grooved substrate 1 is turned over, and the positioning grooves 4 are worked in the back surface of the substrate in the same manner as the positioning grooves 3. Then, the relation between the positions of the grooves formed in the front surface and the positions of the grooves formed in the back surface requires no great accuracy. This is because the positional relation in the X-direction will be accurate if the grooved substrate is halved and the divided surfaces are laminated on each other so as to be opposed in the same direction, similarly to the method of forming the two storied structure.

Thus, when the grooved substrates 1 are successively laminated one on one so that every grooved substrate is turned over alternately, the grooved substrates 1 can be principally laminated in any desired number of stages. In one example, a two-dimensional optical fiber alignment of $4\times 4$ was produced. The pitch of the optical fibers was set to 0.5 mm. In order to measure the accuracy of the two-dimensional optical fiber alignment, other single-core optical fibers put on a stage movable in the X and Y directions at the position opposite the aligning member were connected, the light incident from the single core optical fibers was received by the optical fibers on the aligning member side, and it was recognized that the position where the passing light power was maximized was the central position of the optical fibers. The relative positions of the optical fibers were measured. As a result, it was certified that the accuracy of the optical fiber alignment was within $\pm 1$ $\mu$m.

As described above, according to the present invention, an optical fiber aligning member having a two-dimensional alignment can be easily formed by using a one-dimensional optical fiber aligning member, in which optical fibers are aligned on the same surface, as a base without requiring any additional specific technique.

Accordingly, the two-dimensional connection of optical fibers to other optical fibers, or the two-dimensional connection of optical fibers to optical components can be realized in high density packaging situations.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

What is claimed is:

1. An optical fiber aligning member comprising:
    a plurality of grooved substrates, each of said grooved substrates having a first main surface in which a plurality of optical fiber aligning grooves and at least two first positioning grooves are formed and a second main surface opposite said first main surface in which at least two second positioning grooves are formed, the grooved substrates being laminated one on one in a manner so that every grooved substrate is turned over alternately such that at least one pair of adjacent grooved substrates have first positioning grooves opposing each other and at least one pair of adjacent grooved substrates have second positioning grooves opposing each other;

a plurality of first positioning pins positioned in the opposing first positioning grooves; and a plurality of second positioning pins positioned in the opposing second positioning grooves.

2. The optical fiber aligning member of claim 1, wherein at least one of the grooves is V-shaped.

3. The optical fiber aligning member of claim 2, wherein the V-shaped groove has an angle of 90° between opposing sides of the V.

4. The optical fiber aligning member of claim 1, wherein the grooved substrates are constructed of silicon.

5. The optical fiber aligning member of claim 1, wherein a pitch of at least one of the fiber aligning grooves is 0.25 millimeter.

6. The optical fiber aligning member of claim 1, wherein at least one of the positioning pins is constructed of stainless steel.

7. The optical fiber aligning member of claim 1, wherein at least one of the positioning pins has a diameter of 0.5 millimeter.

8. The optical fiber aligning member of claim 1, wherein four grooved substrates are laminated together.

9. The optical fiber aligning member of claim 1, wherein at least one optical fiber is fixed to at least one of the fiber aligning grooves with an adhesive.

10. A method of forming an optical fiber aligning member comprising the steps of:

forming a plurality of optical fiber aligning grooves and at least two first positioning grooves in a first main surface of a flat plate;

forming at least two second positioning grooves in a second main surface opposite said first surface of the flat plate;

dividing said flat plate in a direction generally perpendicular to the optical fiber aligning grooves so as to obtain grooved substrates;

laminating said grooved substrates one on one in a manner so that every grooved substrate is turned over alternately such that at least one pair of adjacent grooved substrates have first positioning grooves opposing each other and at least one pair of adjacent grooved substrates have second positioning grooves opposing each other, each adjacent pair of grooved substrates having been adjacent each other in the flat plate prior to the dividing step; and placing positioning pins in the opposing positioning grooves.

11. The method of claim 10, wherein the forming step further comprises the step of grinding at least one of the grooves.

12. The method of claim 10, wherein the forming step further comprises the step of milling at least one of the grooves.

13. The method of claim 10, wherein the forming step further comprises the step of molding at least one of the grooves.

14. The method of claim 10, wherein the forming step further comprises forming at least one of the grooves in a V-shape.

15. The method of claim 14, wherein the forming step further comprises the step of forming the V-shaped groove with an angle of 90° between opposing sides of the V.

16. The method of claim 10, wherein the laminating step further comprises the step of laminating four grooved substrates together.

17. The method of claim 10, and further comprising the step of fixing at least one optical fiber to at least one of the fiber aligning grooves with an adhesive.

* * * * *